(12) United States Patent
Provost

(10) Patent No.: US 10,690,197 B2
(45) Date of Patent: Jun. 23, 2020

(54) OUTBOARD-MOTOR AUTOMATIC DISENGAGING CLUTCH SYSTEM AND METHOD

(71) Applicant: Brian Provost, Loreauville, LA (US)

(72) Inventor: Brian Provost, Loreauville, LA (US)

( * ) Notice: Subject to any disclaimer, the term of this patent is extended or adjusted under 35 U.S.C. 154(b) by 264 days.

(21) Appl. No.: 15/834,797

(22) Filed: Dec. 7, 2017

(65) Prior Publication Data

US 2019/0178309 A1   Jun. 13, 2019

(51) Int. Cl.
  *F16D 28/00*   (2006.01)
  *F16D 11/14*   (2006.01)
  *B63H 20/20*   (2006.01)

(52) U.S. Cl.
  CPC .......... *F16D 28/00* (2013.01); *B63H 20/20* (2013.01); *F16D 11/14* (2013.01)

(58) Field of Classification Search
  CPC .......... B63H 20/20; F16D 11/14; F16D 28/00
  See application file for complete search history.

(56) References Cited

U.S. PATENT DOCUMENTS

| | | | | |
|---|---|---|---|---|
| 3,703,642 A | * | 11/1972 | Balaguer | B63H 20/007 290/43 |
| 4,946,411 A | * | 8/1990 | Novey | B63H 21/22 440/84 |
| 5,072,629 A | * | 12/1991 | Hirukawa | B63H 21/213 338/47 |
| 5,348,500 A | * | 9/1994 | Lassanske | B63H 20/245 440/86 |
| 5,692,931 A | * | 12/1997 | Kawai | F02B 61/045 440/86 |
| 6,352,457 B1 | * | 3/2002 | Higby | B63H 21/213 440/86 |
| 2016/0090165 A1 | * | 3/2016 | Suzuki | B63H 20/20 440/87 |
| 2019/0178309 A1 | * | 6/2019 | Provost | F16D 28/00 |

* cited by examiner

*Primary Examiner* — S. Joseph Morano
*Assistant Examiner* — Jovon E Hayes
(74) *Attorney, Agent, or Firm* — Keaty Law Firm LLC

(57) ABSTRACT

An outboard-motor automatic disengaging clutch system and method, providing an improved means of shifting between forward and reverse with an outboard boat motor, providing an ability to shift in circumstances where the propeller is not spinning freely, such as in weeds or mud, and providing improved shifting with less damage to gears in all circumstances. The outboard-motor automatic disengaging clutch can be built into an outboard motor, or can be later-installed as a retrofit. The outboard-motor automatic disengaging clutch provides an electric clutch controlled by a sensor switch activated and deactivated by the mechanical linkages of the outboard motor's shifting system.

16 Claims, 4 Drawing Sheets

OUTBOARD-MOTOR AUTOMATIC DISENGAGING CLUTCH SYSTEM AND METHOD

BACKGROUND

This invention provides an outboard-motor automatic disengaging clutch system and method.

On outboards with a forward-neutral-reverse gearbox, the operator must change gear with the motor at idle. The gearboxes are not synchromesh, but are instead slightly clunky devices that either engage or disengage the appropriate drive sprocket, depending on whether it is to be forward or reverse. There is no smooth transition from "go" to "whoa." It is, instead, either in gear or out of gear.

The power from the crankshaft of the engine is driven to the gearboxes gear via the top "pinion." This pinion then delivers the rotational power to the two gears beneath and meshing with it. These gears rotate in opposite directions. The pinion and gears are rotating all the time the engine is running. A lever, which usually is placed on the left side of the outboard or on a remote control, operates the clutch, which is located between the gears. The clutch is on a spline so it can slide back and forth while still maintaining rotational power. The clutch is moved in the desired direction to one gear or the other. When the clutch is meshed in with one of the gears, because of its matching shape, it rotates the propeller, which drives the boat. To shift to the other gear, the clutch is moved to the opposite gear. When the clutch is in the middle position between the gears, the gearbox is in neutral.

The clutch is a metal device shaped to mesh with the identically-shaped "teeth" on the inside of each gear cog. The clutch slides back and forth on a metal spline, moved by a "U"-shaped metal fingers or prong that slides the clutch back and forth between the two gears by way of the groove around the center of the clutch. In neutral, the clutch does not touch either gear, as it is between the two. Thus, if a gear change is made with the motor running quickly, the transition from neutral to drive can be lumpy and noisy, and a rough gear change may even damage the gears. All gears and the clutch are immersed in gearbox oil to reduce friction.

Outboard motors nearly all use a simple dog clutch type mechanism for connecting the propeller to the engine. This mechanism is an old technology that takes up very little room, can transmit a vast amount of torque in relation to its size, and is relatively cheap and simple to make. These attributes make it suitable for marine applications, where the gear case must be kept as small as possible to reduce underwater drag. The clutch dog is splined to the propeller shaft and allowed to move fore and aft sufficiently to engage the teeth machined on the side faces of forward and reverse gears. Both gears spin freely on the prop shaft, and are rotating whenever the engine is running. The dog clutch is moved to engage the desired gear by a cross pin and shift rod inside the hollow prop shaft. Because the gears are always rotating when shifting occurs, the dog clutch is subject to some wear and tear forces.

Maximum dog clutch life comes from following some simple rules. First, shift at the lowest possible speed, engine at idle and boat stationary. A low engine idle speed is key to the system. Second, always shift into gear quickly. Slowly shifting allows the dog teeth to "rattle" across the driven gear teeth, and the user instead would want the teeth to contact only once for each shift, for minimum wear. Third, do not shift when the engine is switched off (unless someone is turning the prop shaft). If the dog clutch and gear teeth meet end on, the shift linkages can be bend, and then end up in gear jumping trouble because the bent linkages will lead to improper engagement of the dog clutch. Lastly, regularly check the shift system adjustments to ensure the dog clutch is moving to full engagement.

Worn cables or linkages that reduce dog clutch travel can result in gear jumping under load, which rapidly destroys the side faces of the dog clutch teeth, and additionally applies a "hammer blow" type forces to the rest of the transmission. (Because of this, gear jumping is usually described as feeling somewhere between a severe engine misfire and an invisible giant beating on the back of the boat with a very large hammer.) Most large motor dog clutches have some "locking angle" machined into the dog teeth. This angle helps to hold the dog engaged, when the engine torque forces are trying to separate them. Wear and tear reduces the locking angle and the area of the dog teeth in contact with the gear. When the teeth are worn sufficiently that the dog can no longer resist the torque forces on it, it will slide away from the gear and gear jumping will occur. Gear jumping can have a very destructive effect on the whole drive system, so must be addressed immediately. If it is caught very early and is only caused by bad adjustments/worn links, then it can be fixed easily. But if it has been occurring for some time, then gear and dog replacement is required to cure the problem. Gears and dog clutches are surface hardened, so the urge to grab the hand grinder and reface the dog teeth must be resisted. If it is refaced, it will only be a relatively temporary fix, as the softer surfaces exposed will simply wear much quicker than the originals. The locking angle on dog clutch teeth also increases the force required to shift out of gear, especially on fast boats that use big pitch propellers. Most large outboards therefore have a "Shift Interrupter" device that momentarily interrupts ignition as it is shifted to take the load off the gears for a fraction of second. It is typically a spring-loaded switch in the shift linkages on the engine that will ground an ignition circuit if the load on the shift cable or links exceeds and preset minimum.

A conventional outboard motor has a forward-neutral-reverse transmission in the lower unit, and is shifted into and out of forward and reverse from the neutral position. The forward-neutral-reverse transmission parts are in the lower unit. The lower unit is connected to the engine buy the mid-section housing. The engine's crankshaft is connected to the lower unit input gear by the input shaft. When the engine is running the input gear, forward output gear and reverse output gear in the lower unit are rotated around the output shaft by power from the engine through the input shaft.

The input shaft and gear, forward gear, and reverse gears are always rotating while the engine is running. However, even though they are rotating, they do not necessarily supply rotating power to the output shaft. The forward and reverse gears have an inside bore with a bearing that allow them to rotate around the output shaft while the output shaft remains still. The output shaft has a machined spline between the location of the input and output gears. This splined area is fitted with a mated clutch dog. On both end faces of the clutch dog are machined teeth. On the inner faces of both the input gear, and the output gear there are machined teeth that can mate with and are engaged by the clutch dog. The clutch dog is moved to engage with either the reverse gear or the forward gear by a shifting mechanism.

Different manufacturers have different designs of shifting mechanisms, but all move the clutch dog along the splined output shaft to engage with the selected gear.

When the engine is started, the clutch dog teeth are not engaged with either gear. After the engine is running, the operator of the vessel selects forward or reverse rotation of the propeller by moving the clutch dog to the selected motion by the shifting mechanism. At this time the forward and reverse gears are rotating with the engines power at approximately 400 to 500 rpm. The clutch dog, output shaft, and propeller are still. The clutch dog must mate with a gear and rotate the output shaft and propeller at an instant. At this instant the propeller shaft and propeller must go from still to the same RPM that the selected gear is rotating. Due to inertia and the water's resistance on the propeller's pitched blades, the engaging teeth of the gear and clutch dog sometimes deflect off of each other until engagement happens and is complete. Although the gears and clutch are precisely built and hardened, they do incur some wear during this shifting process. Additionally, if not shifted completely, damage may occur.

Most other non-marine forward-neutral-reverse gearboxes utilize a disengaging-engaging clutch when shifting the direction of travel. The driving component is disconnected from the gearbox input shaft. This disconnected area is fitted with a disengaging-engaging clutch that stops the rotation of the input shaft on the gearbox event though the engine is running. The stopped input shaft and gear allow shifting of the gearbox from forward to neutral to reverse while all gearbox components are not moving, also the input gear is not engaged to the engine or the output shaft at this time, so it is free to move into the correct place as the clutch dog moves out of and into the next selected gear.

Outboard motors are able to eliminate the disengaging-engaging clutch because the driven component is rotating in water. Accordingly, there is no positive engagement between the propeller and the water. There is, instead, what the marine world refers to as "slippage." The initial load at start is much less than the load on a driven component on a ground traveling vehicle. A car at rest, with no disengage-engage clutch, cannot be put into forward or reverse with the engine running. The load on the wheels, ground, and driveline will not permit the gearbox to be engaged into forward or reverse while the input shaft and gear is rotating. The outboard motor on a boat at rest, since the load is much less between the propeller and water at the start of propeller rotation due to slippage, can be shifted into forward or reverse.

In the case of the outboard, if the engine is not idling slow enough, faster than the normal idle of the particular outboard motor, the transition into forward or reverse will be difficult. The forward and reverse gears are turning faster than they should be, and the linear motion of the clutch dog is not fast enough to engage the clutch dog teeth properly into the forward or reverse gear. The mating teeth deflect off of each other, causing premature wear or damage. This problem can also occur if the boat is resting in shallow water, or water with heavy vegetation. The propeller blades may be in contact with a muddy or hard bottom of the body of water, or grass or weeds that put heavier loading, due to less or no slippage on the output shaft and gears at propeller rotation start. This load on the propeller will cause extreme loading on the clutch dog and gear engaging system when transition from neutral into forward or reverse.

Even when the outboard motor is idling properly, and the propeller blades are in deep open water, the load at propeller rotation is not completely eliminated. The weight of the propeller, especially if stainless steel, and not aluminum, the resistance of the water to the propeller rotation, and the load of the water being pushed by the propeller as it starts to rotate, still cause somewhat rough and clunky shifting. This has always been accepted in the outboard motor world, but it is not ideal and there is room for improvement.

Lastly, when operating under conditions of mud or weeds, which strongly resist the rotation of the propeller, the present transmission systems of outboard motors are very unsatisfactory. When stuck in those conditions, the desired course of action is to run the propeller in reverse and with plenty of power. But, because the propeller is not at all free-spinning, shifting into reverse might be entirely impossible, and will be rough and clunky and damaging to the gear box even if the shift is made. There is therefore a need for a disengaging clutch system that will perform automatically and that can be retrofitted into existing outboard motors as well as being built into them.

SUMMARY OF THE INVENTION

This invention provides an outboard-motor automatic disengaging clutch system and method, providing an improved means of shifting between forward and reverse with an outboard boat motor, providing an ability to shift in circumstances where the propeller is not spinning freely, such as in weeds or mud, and providing improved shifting with less damage to gears in all circumstances. The outboard-motor automatic disengaging clutch can be built into an outboard motor or can be later-installed as a retrofit. The outboard-motor automatic disengaging clutch provides an electric clutch controlled by a sensor switch activated and deactivated by the mechanical linkages of the outboard motor's shifting system.

BRIEF DESCRIPTION OF DRAWINGS

Reference will now be made to the drawings, wherein like parts are designated by like numerals, and wherein.

DETAILED DESCRIPTION OF THE INVENTION

Figure 1:
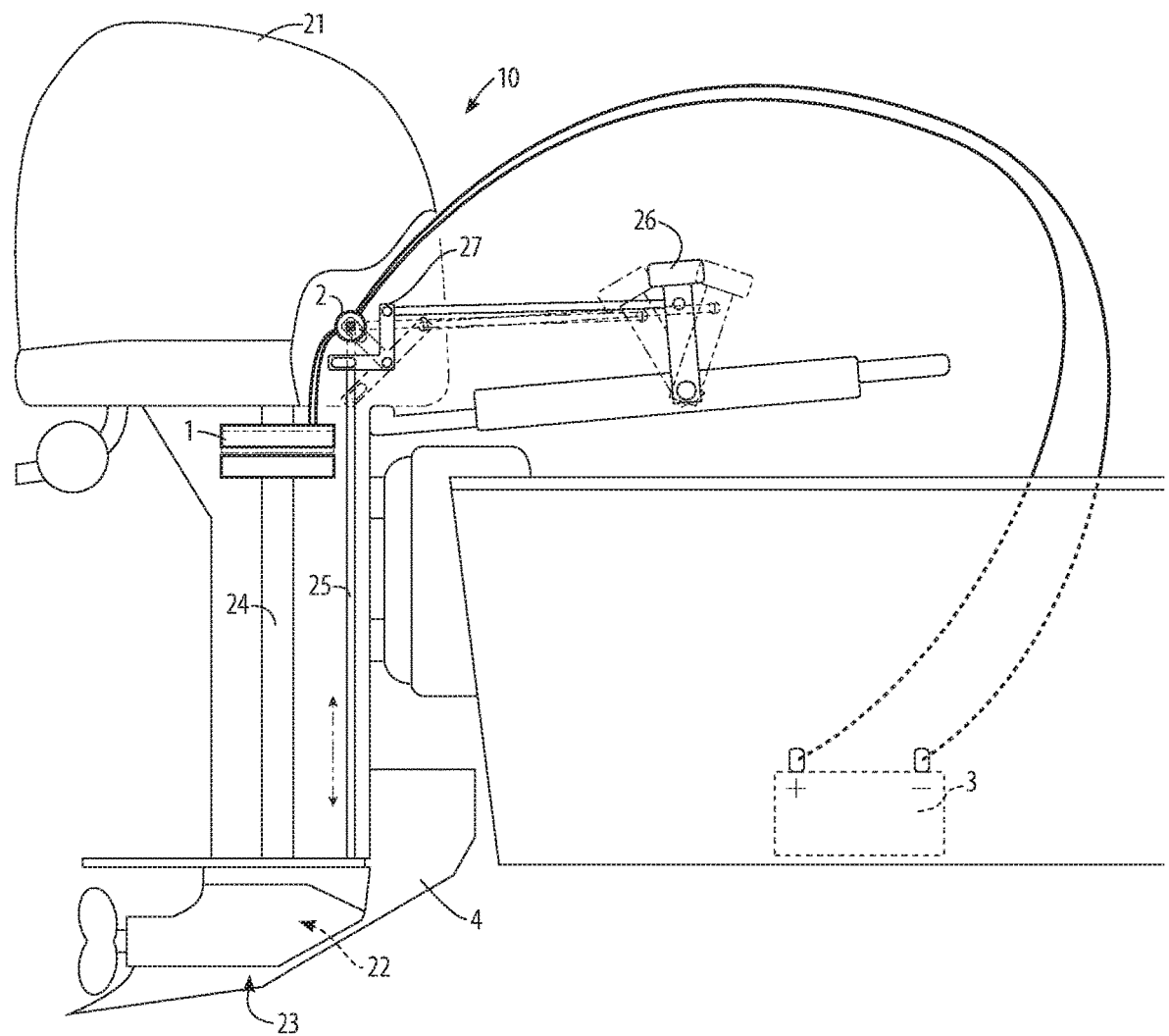
FIG. 1 is a schematic view of the outboard-motor automatic disengaging clutch of the invention in use.

Referring to FIG. 1 and all of the figures generally, the outboard-motor automatic disengaging clutch 10 of the invention is shown.

The outboard motor 21 is mounted on a boat, with the gear box 22 enclosed in a lower assembly 23 underwater. A drive shaft 24 transmits the power of the engine to the gear box 22. A clutch-dog shift rod 25 is moved up and down in order to push or pull the clutch dog into forward, neutral, or reverse. A gear-shift control 26 is manipulated by the operator of the vessel, which causes a generally horizontal movement of a fixed-length connector rod, which in turn pushes or pulls a transfer pivot 27, to which the clutch-dog shift rod 25 is also attached, with the result of transferring the generally horizontal movement from the gear-shift control 26 into a generally vertical movement of the clutch-dog shift rod 25. The pivoting movement is illustrated.

The outboard-motor automatic disengaging clutch 10 provides an electric disengaging-engaging clutch 1 interrupting the drive shaft 24. This electric disengaging-engaging clutch 1 is different from the clutch dog of the outboard motor. When the electric disengaging-engaging clutch 1 is engaged, the power from the engine is transmitted through the drive shaft 24, and when the electric disengaging-engaging clutch 1 is disengaged, the power is not transmitted.

The engaged or disengaged status of the electric disengaging-engaging clutch 1 is controlled by the provided control switch 2. The control switch 2 is a momentary contact type of switch, such as a spring-loaded push-button or roll-over switch, in its simplest forms, or an optical, magnetic (Hall-effect) or proximity sensor in more elaborate forms. The control switch 2 is mounted in relation to the transfer pivot 27 so that the control switch is pressed, or otherwise triggered, by one or another arm of the transfer pivot 27 when the gear-shift control 26 is in either the forward or the reverse position. When the gear-shift control 26 is in a neutral position, the control switch is not pressed because neither arm of the transfer pivot 27 is in close proximity.

The electrical energy for the operation of the disengaging-engaging clutch 1 through the control switch 2 is provided by a battery 3 or other source. This battery can be one that is already on board and attached to the outboard motor, or a battery installed just for the purpose of operating the disengaging-engaging clutch 1.

The disengaging-engaging clutch 1 can be either a normally-engaged clutch when it is not energized, which pulls apart or otherwise disengages when energized by the control switch 2, or can be a normally-disengaged clutch which engages when energized by the control switch 2. Depending on the nature of the disengaging-engaging clutch 1, the control switch 2 can be normally-closed or normally-open. The disengaging-engaging clutch 1 should be engaged when the transfer pivot 27 is in a position corresponding to the gear-shift control 26 being in forward or reverse position, and should be disengaged when the transfer pivot 27 is in a position corresponding to a neutral position. Because the gear-shift control 26 and the transfer pivot 27 have to pass through the neutral position when changing between forward and reverse, the disengaging-engaging clutch 1 will always disengage for at least a moment during shifting. Disengagement of the disengaging-engaging clutch 1 results in an absence of force from the drive shaft 24 to the gear box 22, and therefore allows the lower unit gearbox clutch dog to be shifted to engage with the forward gear or to engage with the reverse gear while the rotation of the forward and reverse gears are at rest and free to locate into the selected position, which allows smooth shifting and reduced grinding and jamming. By providing for smoother shifting, the outboard-motor automatic disengaging clutch allows the use of more aggressive clutch dog teeth and mating-gear engaging teeth in the gear box 22. Without the outboard-motor automatic disengaging clutch, the more aggressive designs cannot be used, because such aggressive designs have locking angles on the contacting surfaces of the teeth, which make shifting difficult when under torque from the drive shaft 24.

The outboard-motor automatic disengaging clutch allows an effective quick-reversing capability for shallow-water outboards. Such a quick-reversing capability is important for shallow-water operations, in order to slow down or stop a boat when docking or approaching another vessel, and when maneuvering in clean water conditions.

The outboard-motor automatic disengaging clutch 10 provides a "neutral" apart from the neutral position of the clutch dog. This can be beneficial in circumstances such as a series of pulsed or jogged surges in the same direction, where the clutch dog does not move into the neutral position, and therefore a large number of disengagements and reengagements of the teeth in the gear box 22 are avoided, along with their wear and tear.

Existing quick propeller reversing systems currently available on shallow water outboard motors do not perform well in shallow, obstructed water or clean water because the propeller shaft enters the water at an angle from the drive gear or drive belt pulley that is above the water. The thrust when in reverse is directed at the surface of the water and the atmosphere. The atmosphere does not provide substantial matter for the propeller to achieve thrust against in order to pull the boat backwards. To add to the problem, the water that is being moved by the propeller to the water surface is coming into contact with the stern of the boat, counteracting the pull of the propeller. When using this invention, at non planning speeds, the lower unit/transmission is under water. The lower unit/transmission can be lowered even more with the power trim. The propeller shaft is close to parallel to the water surface and the propeller thrust is not directed at the surface. It is, instead, directed at the body of water. The body of water provides substantial matter for the reversing propeller to thrust against and effectively pull the boat backwards.

To enable conventional type outboard motor lower units to be used in debris-filled waters by the elimination of the vertical leading edge of the lower unit traveling in front of the propeller through the water. When traveling, if this vertical edge comes into contact with debris, such as vegetation, this debris becomes attached to the edge due to the force of the water. This vegetation hinders or halts performance. Similarly, if a hard object, such as a rock, log, or tree stump, is encountered, the lower unit and motor take a hard hit. A skeg 4 has been added, which extends from under the propeller at an angle upward and continues out above the surface of the water in front of the lower unit. This skeg 4 deflects and directs debris under the lower unit and propeller. If a hard object is encountered, the long angled skeg 4 provides a lifting effect, compared to an abrupt hit with the convention outboard skeg.

Figure 2:
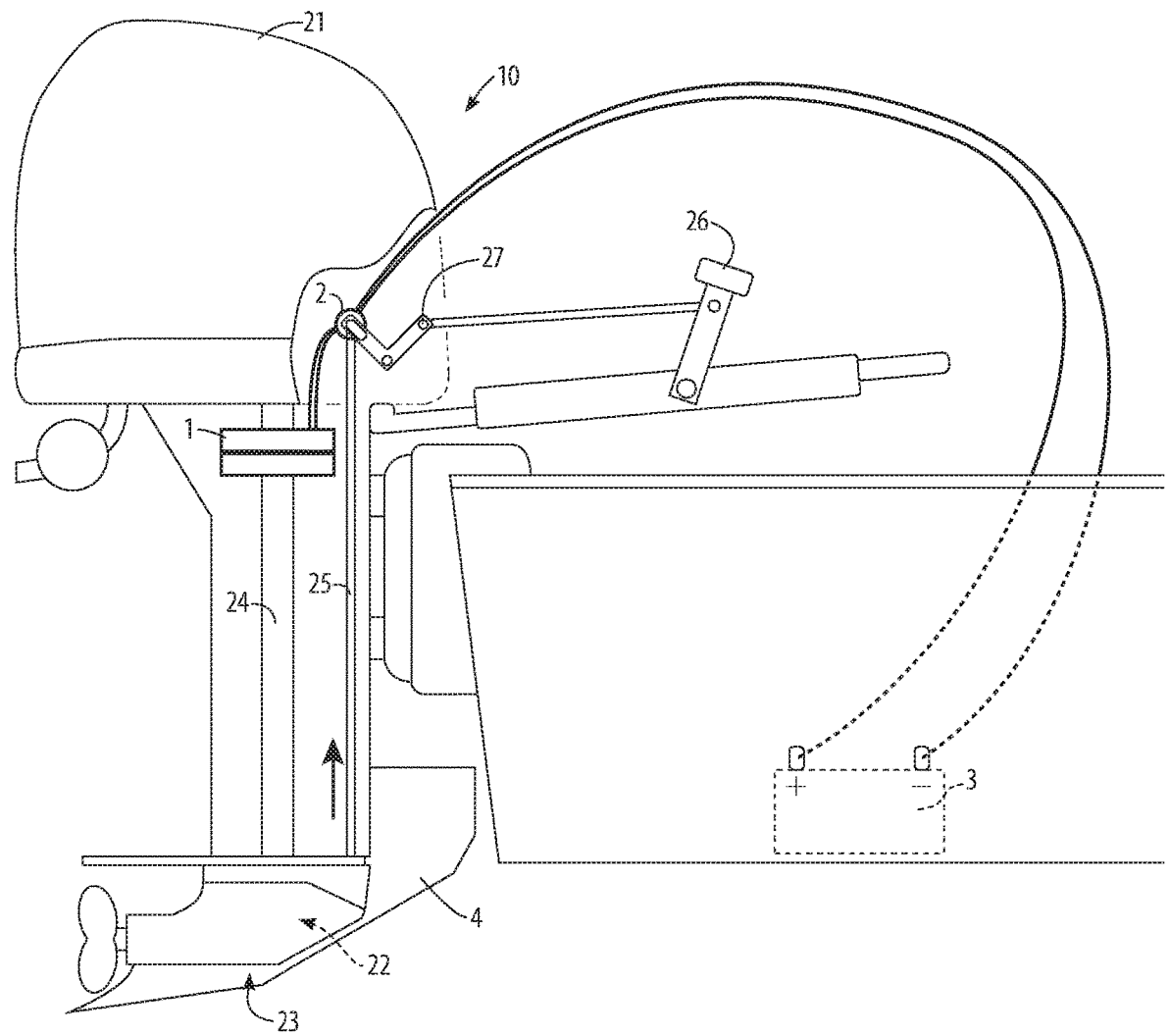
FIG. 2 is a schematic view of the outboard-motor automatic disengaging clutch of the invention in use in forward gear.

Referring to FIG. 2, when the gear-shift control 26 is placed in the forward position, the transfer pivot 27 is pulled forward by one arm, and the other arm pulls the clutch-dog shift rod 25 upward, activating the control switch 2, in turn causing the electric disengaging-engaging clutch 1 to become engaged, and for power to be transmitted through the drive shaft 24 to the gear box 22.

Figure 3:
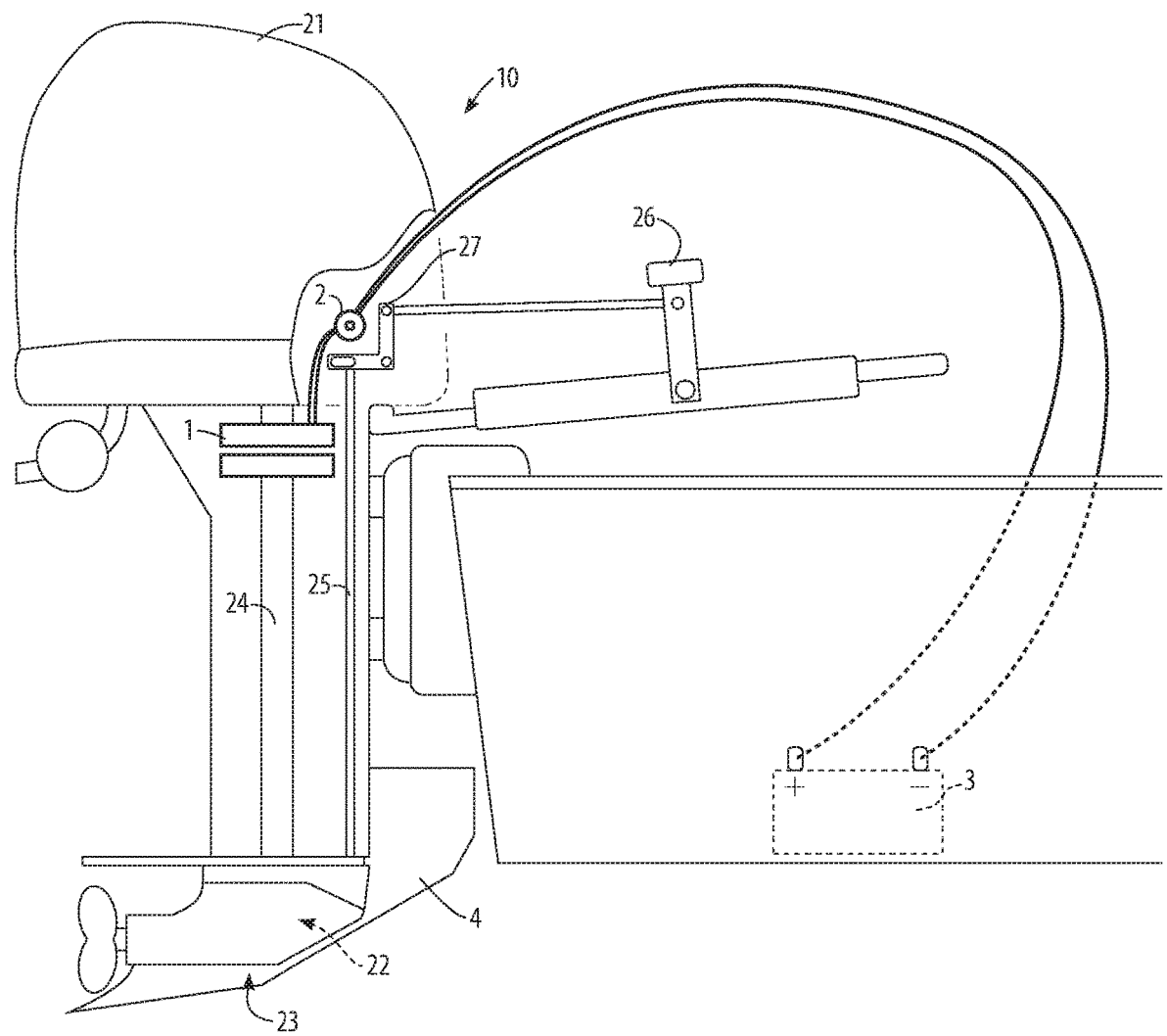
FIG. 3 is a schematic view of the outboard-motor automatic disengaging clutch of the invention in use in neutral.

Referring to FIG. 3, when the gear-shift control 26 is placed in the neutral position, whether such placement is transitory and incidental to shifting between forward and reverse, or is an intentional placing in neutral, the transfer pivot 27 is moved into an intermediate position, with neither arm activating the control switch 2, in turn causing the electric disengaging-engaging clutch 1 to become disengaged.

Figure 4:
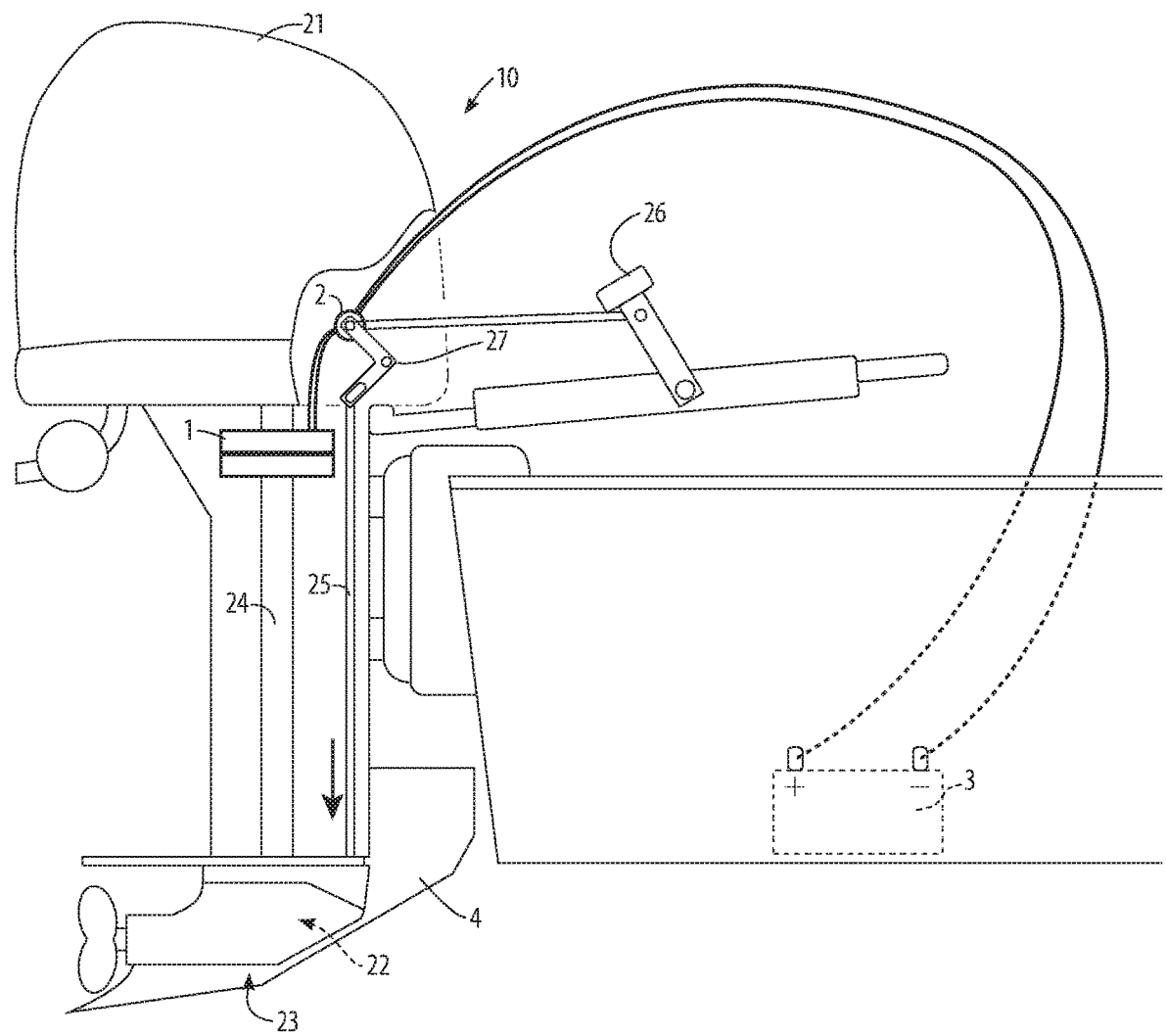
FIG. 4 is a schematic view of the outboard-motor automatic disengaging clutch of the invention in use in reverse gear.

Referring to FIG. 4, when the gear-shift control 26 is placed in the reverse position, the transfer pivot 27 is pushed backward by one arm, and the other arm pushes the clutch-dog shift rod 25 downward, activating the control switch 2, in turn causing the electric disengaging-engaging clutch 1 to become engaged, and for power to be transmitted through the drive shaft 24 to the gear box 22.

Many other changes and modifications can be made in the system and method of the present invention without departing from the spirit thereof. I therefore pray that my rights to the present invention be limited only by the scope of the appended claims.

I claim:

1. An outboard-motor automatic disengaging clutch system, for use with an outboard motor having an engine, drive shaft, gear box, clutch-dog shift rod, and a gear-shift control connected to a transfer pivot, the outboard-motor automatic disengaging clutch comprising:
   (i) a disengaging-engaging clutch adapted to disengage and engage the transfer of power from the drive shaft to the gear box using electric power;
   (ii) a control switch adapted to sense the position of the transfer pivot and to provide or withhold electric power from said disengaging-engaging clutch based on the position of the transfer pivot; and
   (iii) a battery adapted to provide electric power to said disengaging-engaging clutch through said control switch;
   where, in use, said control switch, upon sensing the position of the gear-shift control connected to the transfer pivot, causes engagement of said disengaging-engaging clutch when the position of the gear-shift control and transfer pivot correspond to the forward or reverse gear, and causes disengagement of the disengaging-engaging clutch when the position of the gear-shift control and transfer pivot correspond to a neutral position; and
   where, in use, the disengagement of said disengaging-engaging clutch in the neutral position removes force upon the gear box through the drive shaft, thereby allowing smoother action of the clutch-dog shift rod upon the gear box.

2. The outboard-motor automatic disengaging clutch system of claim 1, further adapted for use in obstruction-filled water.

3. The outboard-motor automatic disengaging clutch system of claim 1, where said electric disengaging-engaging clutch further provides the neutral position for the outboard motor.

4. The outboard-motor automatic disengaging clutch system of claim 1, further comprising a retrofit kit for an existing outboard motor.

5. The outboard-motor automatic disengaging clutch system of claim 1, where said electric disengaging-engaging clutch and said control switch are built into the outboard motor at time of manufacture.

6. The outboard-motor automatic disengaging clutch system of claim 1, where said control switch further comprises a momentary push-button switch.

7. The outboard-motor automatic disengaging clutch system of claim 1, where said control switch further comprises a momentary roller switch.

8. The outboard-motor automatic disengaging clutch system of claim 1, where said control switch further comprises an electronic sensor.

9. An outboard-motor automatic disengaging clutch method, for use with an outboard motor having an engine, drive shaft, gear box, clutch-dog shift rod, and a gear-shift control connected to a transfer pivot, the outboard-motor automatic disengaging clutch method comprising:
   (i) providing an outboard-motor automatic disengaging clutch system, in turn comprising:
      (a) a disengaging-engaging clutch adapted to disengage and engage the transfer of power for the drive shaft to the gear box using electric power;
      (b) a control switch adapted to sense the position of the transfer pivot and to provide or withhold electric power from said disengaging-engaging clutch based on the position of the transfer pivot; and
      (c) a battery adapted to provide electric power to said disengaging-engaging clutch through said control switch; and
   (ii) using said outboard-motor automatic disengaging clutch system;
   where, in use, said control switch, upon sensing the position of the gear-shift control connected to the transfer pivot, causes engagement of said disengaging-engaging clutch when the position of the gear-shift control and transfer pivot correspond to the forward or reverse gear, and causes disengagement of the disengaging-engaging clutch when the position of the gear-shift control and transfer pivot correspond to a neutral position; and
   where, in use, the disengagement of said disengaging-engaging clutch in the neutral position removes force upon the gear box through the drive shaft, thereby allowing smoother action of the clutch-dog shift rod upon the gear box.

10. The outboard-motor automatic disengaging clutch method of claim 9, where said outboard-motor automatic disengaging clutch is further adapted for use in obstruction-filled water.

11. The outboard-motor automatic disengaging clutch method of claim 9, where said electric disengaging-engaging clutch further provides the neutral position for the outboard motor.

12. The outboard-motor automatic disengaging clutch method of claim 9, further comprising providing a retrofit kit for an existing outboard motor.

13. The outboard-motor automatic disengaging clutch method of claim 9, where said electric disengaging-engaging clutch and said control switch are built into the outboard motor at time of manufacture.

14. The outboard-motor automatic disengaging clutch method of claim 9, where said control switch further comprises a momentary push-button switch.

15. The outboard-motor automatic disengaging clutch method of claim 9, where said control switch further comprises a momentary roller switch.

16. The outboard-motor automatic disengaging clutch method of claim 9, where said control switch further comprises an electronic sensor.

* * * * *